Patented Nov. 8, 1938

2,135,553

UNITED STATES PATENT OFFICE 2,135,553

ARYL MERCURY SULPHONAMIDES

Carl N. Andersen, Wellesley Hills, Mass., assignor to Lever Brothers Company, a corporation of Maine No Drawing. Application April 28, 1937, Serial No. 139,505

19 Claims. (Cl. 260—334)

The present invention relates to a method of producing certain new aromatic mercury sulphonamides and to the compounds produced thereby.

It is an object of my invention to produce aromatic mercury sulphonamides which are useful as germicides, fungicides, insecticides, and for other analogous purposes.

The sulphonamido group is: $-SO_2.NH_2$. I have discovered that when one or both of the hydrogens of the sulphonamido group in any sulphonamide, or any other atom or group of atoms which may be substituted for the sulphonamide hydrogen, is replaced by the essential radical of certain aromatic mercury compounds, new compounds are produced which have extraordinarily high potency as antiseptics and germicides and at the same time are characterized by relatively low toxicity and other desirable properties.

The compounds I have produced may be described as having the general formula $(RHg)_x.R_1$, in which R represents an aromatic structure to a carbon atom of which the mercury is directly attached; in which $x$ is an integer representing the number of RHg groups attached to sulphonamido nitrogen; and in which $R_1$ is a radical of any compound having a sulphonamido group. While the words "group" and "groups" are used hereinafter, it will be obvious that these words are to be understood as singular or plural depending upon the value of $x$.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, mono- or polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

The integer represented by $x$ is one if a single RHg group is attached to the sulphonamido nitrogen; it will be two if two RHg groups are attached to one sulphonamido nitrogen; or if one RHg group is attached to each nitrogen in two different sulphonamido groups; similarly, it may be three or more, depending on the number of sulphonamido groups in the compound and the number of RHg groups attached thereto.

The amines containing the $-NR_2$ group directly attached to a carbon atom of a hydrocarbon structure do not react readily with aromatic mercury compounds to replace the hydrogens of such an $-NH_2$ group. However, I have discovered that due to the negative character of the sulphonyl group, the hydrogen atoms, or other atoms replacing the same, in a sulphonamido group in any compound, are more reactive and may be replaced with aromatic mercury radicals.

When sulphonic acids, which contain the $-SO_3H$ group, are treated with phosphorus pentachloride, they are converted into sulphonyl chlorides which contain the $-SO_2.Cl$ group. When the sulphonyl chlorides are treated with an excess of concentrated ammonia, they are converted into corresponding sulphonamides which contain the $-SO_2.NH_2$ group. Thus it will be seen that a sulphonamide corresponding to every sulfonic acid may be readily prepared, and the aromatic mercury derivatives of all suphonamides are within the scope of my invention.

The sulphonamides to which the radical $R_1$ corresponds may have various structures; they may be cyclic or acyclic, saturated or unsaturated, substituted or unsubstituted, and may contain one or more sulphonamido groups. The substituted sulphonamides may have other atoms or radicals, for example, the imino, halogen, hydroxy or aliphatic or cyclic hydrocarbon radicals, substituted in either the sulphonamido group or in the aliphatic or cyclic structure to which that group is secured. If the substituted atom or radical is reactive with the aromatic mercury compound, for example, the carboxyl radical, the RHg group may be substituted in that radical, as well as in the sulphonamido group. The sulphonamides may be of various molecular weights; if they have a cyclic structure they may be mono- or polynuclear and hetero- or carbocyclic.

As examples of such aliphatic sulphonamides, I may mention cetyl sulphonamide, as well as other similar sulphonamides of lower molecular weight, both saturated and unsaturated.

As representative of the aromatic sulphonamides, I may mention benzene sulphonamide; ortho sulphonamido sodium benzoate; ortho benzoic sulphimide; b-naphthalene sulphonamide; p-amino benzene sulphonamide; p-toluene sulphonamide; o-toluene sulphonamide; p-acetyl-amino benzene sulphonamide; p-toluene sulphone N-ethyl amide; p-amino brom benzene sulphonamide; chloramine-T (sodium salt of N-chloro- p-toluene sulphonamide); monohydrochloride of 4-sulphonamido-2, 4-diamino azo benzene; disodium salt of 4'-sulphamido-phenyl-2-azo-7-acetylamino-1-hydroxy-naphthalene-3, 6-disulphonic acid; n-methyl-p-acetylamino benzene sulphonamide; p-acetylamino naphthalene-4-sulphonamide; 1-amino benzene-2, 4, 6-trisulphonamide, and n-amino acetanilide.

Heterocyclic sulphonamides may similarly be used, for example, compounds such as the dye Saccharein (Schultz 7th ed. #859; Colour Index #744).

The expression "sulphonamide" as used herein is intended to be generic and include any compound containing a sulphonamido group.

The general method of producing my novel compounds consists in reacting together the sulphonamide and any soluble compound containing an aromatic mercury radical of the above mentioned type. A common solvent for both reacting components is employed. If the aromatic mercury compound formed is relatively insoluble as compared with the reacting components, upon its precipitation it may be filtered, washed and dried. If the compound is not insoluble, the reaction mixture may be concentrated by evaporation to precipitate the compound. The compound I prefer to use for reacting with the sulphonamide is the aromatic mercury hydroxide. This has the advantage that water is the only other product and the resulting compound is therefore easily purified. When the compound is employed in connection with uses which require it to be in solution, the mixture at the end of the reaction may be employed directly. I may also employ any soluble aromatic mercury salt, for example, the acetate, lactate or borate, in the reaction with the sulphonamide compound. The aromatic mercury sulphonamides produced are of relatively low solubility as compared with the aromatic mercury salt and are relatively insoluble as compared with the original sulfonamide.

The following examples are given as illustrative of the process which is comprised in my invention, and as illustrative of representative organic mercury derivatives of sulphonamides falling within the scope of my invention:

Example 1

10.35 grams of beta-naphthalene sulphonamide is dissolved in 200 cc. of alcohol and to this solution is added 14.7 grams of phenyl-mercury hydroxide dissolved in 500 cc. of water. A white precipitate results. The mixture is allowed to stand and is then filtered. The precipitate is recrystallized from ethyl alcohol, and is found to have a melting point of 185.2° C. It is the compound N-monophenylmercury beta-naphthalene sulphonamide.

Example 2

17.64 grams of phenylmercury hydroxide is dissolved in 4 liters of water and heated until solution is complete. The solution is filtered to remove any insoluble material. To the filtrate is added an aqueous solution containing 10.36 grams of benzene sulphonamide, and a turbid solution and an amorphous precipitate results. The solution is allowed to stand and is filtered. The precipitate is washed well and dried. Upon recrystallization from alcohol it melts at 202–205° C. The compound is the N-monophenylmercury benzene sulphonamide.

The di-substituted phenylmercury derivative may be prepared in a similar manner by employing 35.28 grams of phenylmercury hydroxide. This compound has a melting point of 212.5° C. and is the N-diphenylmercury benzene sulphonamide.

Example 3

18.59 grams of chloramine-T is dissolved in 200 cc. of alcohol and heated until solution is complete. To the solution is added 17.64 grams of solid phenylmercury hydroxide. The mixture is heated until practically a complete solution results, after which the alcohol is evaporated and the solution filtered and allowed to crystallize. The crystals which are formed are separated by filtration, washed and dried. The product has a melting point of 171–179° C. The compound is the N-phenylmercury derivative of chloramine-T.

Example 4

17.64 grams of phenylmercury hydroxide is dissolved in 1 liter of water and heated until solution is complete. The solution is then filtered into an alcohol solution containing 11.94 grams of para-toluene sulphone ethyl amide. A milky turbidity results and the mixture is allowed to stand and cool after thorough agitation. The precipitate is separated by filtration, washed with water and dried. It is re-crystallized from alcohol and has a melting point of 125° C. It is the compound N-monophenylmercury ethyl para-toluene sulphonamide.

Example 5

2.94 grams of phenylmercury hydroxide is dissolved in 500 cc. of water and heated until solution is complete. The solution is filtered to remove any insoluble material. To the filtrate is added 6 grams of Saccharein (Schultz #859, Colour Index #744) dissolved in 100 cc. of alcohol. The mixture is heated for a few minutes and allowed to cool. Due to the solubility of the compound formed, it does not precipitate at once. The solution is evaporated to one-third of its original volume and upon cooling, red crystals precipitate. The mixture is filtered and the precipitate washed well with water and a few cc. of alcohol and dried. The compound is the N-phenylmercury derivative of Saccharein.

Example 6

20.1 grams of ortho sulphonamido benzoic acid is dissolved in 200 cc. of alcohol. This is neutralized by adding thereto a solution of 4 grams of sodium hydroxide dissolved in approximately 100 cc. of water, until the mixture is neutral against phenolphthalein indicator. As a result of this neutralization ortho sulphonamido sodium benzoate (sodium salt of ortho sulphonamido benzoic acid) is formed. In a separate container 29.4 grams of phenylmercury hydroxide is dissolved in one liter of alcohol and heated until solution is complete. This solution is filtered directly into the ortho sulphonamido sodium benzoate. A clear solution results upon the addition and the mixture is concentrated to about one-half its original volume and allowed to stand. A white nodular residue separates which is removed by filtration, washed with alcohol and dried. The material has a melting point of 165° C. An analysis of the mercury content shows the compound to be ortho N-diphenylmercury sulphonamido sodium benzoate.

When the above procedure is repeated employing water instead of alcohol as the solvent, a material is precipitated which melts at 134° C., and effervesces at 152° C. If this material is first heated in an oven, it melts at 163° C. The latter melting point is sufficiently close to the melting point of the compound obtained when alcohol is employed as the solvent to indicate that both compounds are identical except for water of crystallization in the latter compound.

When relatively larger, for example, twice the quantity of phenylmercury hydroxide is employed in a procedure similar to that set forth in the first paragraph under this example, a material is obtained which has a melting point considerably higher than 163–165° C. I believe this compound to contain three phenylmercury groups but I have not been able to identify its exact structure.

In carrying out any of the processes under Example 6, the reacting components are not completely precipitated. If the mother liquor is evaporated to dryness the resulting material has a melting point considerably higher than 163–165° C., and is believed to be similar to the material described in the previous paragraph.

Example 7

Aromatic mercury sulphonamido sodium benzoates may also be prepared by employing the sodium salt of ortho benzoic sulphimide (sodium saccharin).

To prepare the compound in this manner, 88.2 grams of phenylmercury hydroxide is dissolved in 4 liters of water. When the solution is complete 67.2 grams of anhydrous sodium saccharin, dissolved in 100 cc. of water, is added to the solution. Turbidity results, but after heating for a few minutes the solution becomes clear. The solution is filtered and any gum on the top is removed with a stirring rod. The filtered solution is permitted to cool and a nodular precipitate forms. This is removed by filtration, washed and dried. It melts at 163–165° C. The melting point and analysis of the mercury content shows the material to be identical with the compound prepared from the ortho sulphonamido sodium benzoate, namely, ortho N-diphenylmercury sulphonamido sodium benzoate.

When the mother liquor is evaporated to dryness a material results which has a melting point considerably higher than 163–165° C. This compound is believed to be similar to that obtained by the evaporation of the mother liquor as described in the previous example.

Not all of the reacting components separate to form the nodular precipitate. The remaining solution of mother liquor has germicidal properties and the phenylmercury compound remaining in solution is relatively soluble. The solution may be used directly and it functions as a very effective germicide, particularly in cases which require a potent, yet soluble germicide. If the mother liquor is evaporated to dryness the resulting material is relatively insoluble and cannot be dissolved in the same amount of liquid from which it was obtained by evaporation of the mother liquor. This indicates that some transformation or intramolecular rearrangement takes place when the compound is converted into the solid form and that this arrangement is permanent.

To determine the structure of the phenylmercury compound in solution in the mother liquor, the solution is neutralized with an acid, such as acetic acid, in order to replace the sodium atom in the carboxyl group with a hydrogen atom. A precipitate forms which is the corresponding acid derivative. The precipitate is separated by filtration, washed and dried. It sinters at 202–209° C. and then melts sharply at 209° C. An analysis of the material shows it to be N-monophenyl-mercury sulphonamido benzoic acid. This is an additional illustration of a compound falling within the scope of my invention. The analysis indicates that the phenylmercury compound in solution in the mother liquor is N-monophenyl-mercury sulphonamido sodium benzoate.

Example 8

51.6 grams of para-amino benzene sulphonamide is dissolved in 500 cc. of alcohol. To this is added a filtrate solution containing 88.2 grams of phenylmercury hydroxide dissolved in 4 liters of water. A voluminous white precipitate results at once. The mixture is allowed to cool and is filtered. The precipitate is washed with cold water and recrystallized from alcohol in which it is rather difficultly soluble. It has a melting point of 208.5–211.5° C. and is the compound N-monopheylmercury para-amino benzene sulphonamide.

Example 9

17.64 grams of phenylmercury hydroxide is dissolved in 1 liter of water and heated until solution is complete. The solution is filtered into an alcoholic solution containing 10.26 grams of para-toluene sulphonamide. A turbid solution results and upon standing a voluminous matty, crystalline mass is obtained. The crystals are separated by filtration from the clear supernatant liquid, and dried. They are recrystallized from alcohol in which they are readily soluble. The product has a well defined crystalline structure which melts at 147.5–148° C. and is the compound N-monophenyl-mercury para-toluene sulphonamide.

If 35.28 grams of phenylmercury hydroxide is employed in 2 liters of water, instead of the amounts designated above, the product has a well defined crystalline needle structure which melts at 209.5° C. and is the compound N-diphenylmercury para-toluene sulphonamide.

The N-monophenylmercury ortho-toluene sulphonamide may be prepared in a similar manner by employing 17.64 grams of phenylmercury hydroxide in 1 liter of water and 10.26 grams of ortho-toluene sulphonamide. This product upon crystallization from alcohol has a melting point of 159.5° C.

The N-diphenylmercury ortho-toluene sulphonamide may be employed by preparing 35.28 grams of phenylmercury hydroxide in 2 liters of water and 10.26 grams of ortho-toluene sulphonamide. This compound, upon crystallization from alcohol, has a melting point of 174° C.

Example 10

17.64 grams of phenylmercury hydroxide is dissolved in 1 liter of water and heated to boiling until solution is complete. The solution is then filtered and there is added thereto 15.12 grams of para-acetylamino benzene sulphonamide in a solution of acetone. A white crystalline precipitate results. After the material has been allowed to cool, it is filtered and the precipitate washed and dried. Upon crystallization from hot alcohol it melts at 228° C. and is the compound N-monophenylmercury para-acetylamino benzene sulphonamide.

The N-diphenylmercury para-acetylamino benzene sulphonamide may be prepared in a similar manner by employing 35.28 grams of phenylmercury hydroxide in 2 liters of water and 15.12 grams of para-acetylamino benzene sulphonamide. This compound has a melting point of 212–214° C.

Example 11

28 grams of phenylmercury hydroxide is dissolved in 1500 cc. of water and heated until the solution is complete. The solution is filtered and there is added thereto 24 grams of para-amino brom benzene sulphonamide, dissolved in 200 cc. of alcohol. A precipitate does not result immediately upon the addition, but after the solution is filtered solid agglomerations are formed upon cooling. The precipitate is separated by filtration and recrystallized from alcohol. It has a melting point of 186° C., and is the compound N-monophenylmercury para-amino brom benzene sulphonamide.

Example 12

8.82 grams of phenylmercury hydroxide is dissolved in 300 cc. of alcohol and the solution filtered. To the filtrate is added 100 cc. of alcohol containing 9.65 grams of cetyl sulphonamide dissolved therein. Upon cooling the mixture white nodules crystallize which are separated by filtration. Upon recrystallization from alcohol, the product has a melting point of 105° C. and is the compound N-monophenylmercury cetyl sulphonamide.

From my investigation of compounds of this type I am led to believe that aromatic mercury derivatives corresponding to all of the sulphonamides may be prepared by methods analogous to those described above. I therefore intend my invention to be generic and include the entire group.

From the specific examples it will be obvious to one skilled in the art what procedure is to be followed in producing these other compounds. Theoretical quantities of reacting materials are generally employed. In some cases, if desired, approximately 10% excess of the sulphonamide may be used in order to insure complete conversion of the aromatic mercury compound.

The operativeness of the process is not found to depend in any degree upon the temperature at which the reaction is effected. It is convenient to use heat because it facilitates the solubility of the reacting components and speeds the reaction, but the process may be carried out at any temperature, for example, room temperature. If the reacting components are both water soluble, water is used as the solvent for reasons of convenience. The process, however, may be carried out in any solvent in which both the reacting components are soluble. For example, the alcohols or acetone, or mixtures of these with each other, or with water, may be employed, depending on the solubility of the reacting components. In some instances, the solvent employed will determine whether or not there will be water of crystallization in the final compound, but it will not otherwise affect the structure of the compound. All the compounds produced as above described are characterized by extraordinarily high potency as germicides. Tests to determine the efficacy of some of them in killing *B. Typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Department of Agriculture, December, 1931, described as F. D. A. method against *Eberthella typhi* (typhoid bacillus) at 37° C. and F. D. A. Special Method against *Staph. aureus* at 37° C.

As illustrative of the potency of the compounds, the killing power of the following compounds is given merely as illustrative.

The figures represent the maximum dilutions at which killing in 15 minutes resulted:

|  | B. typhosus | Staph. aureus |
|---|---|---|
| N-phenylmercury benzenesulphonamide | 1:80,000 | 1:50,000 |
| N-phenylmercury derivative of chloramine-T | 1:60,000 | 1:45,000 |
| N-phenylmercury derivative of saccharin | 1:57,000 | 1:38,000 |
| Ortho N-monophenylmercury sulphonamido sodium benzoate | 1:80,000 | 1:60,000 |
| N-diphenylmercury paraamino benzene sulphonamide (in alchol) | In excess of 1:100,000 | 1:20,000 |
| N-diphenylmercury paratoluene sulphonamide | 1:100,000 | 1:20,000 |
| N-diphenylmercury orthotoluene sulphonamide | 1:100,000 | 1:20,000 |
| N-monophenylmercury paraamino brom benzene sulphonamide | 1:115,000 | |

In addition to their high germicidal value, all of these compounds are characterized by relatively low toxicity. Because of these properties it is possible to use them in extreme dilutions and in many situations where known germicides, because of toxic or other undesired properties, cannot be employed. They may be used externally and locally, and in some cases administered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

This application is a continuation in part of my application Serial No. 12,442, filed March 22, 1935.

I claim:

1. The method of preparing aromatic mercury sulphonamides in which the aromatic mercury radical is linked to a sulphonamido group, which comprises reacting in solution a sulphonamide and an aromatic mercury compound of the kind in which the mercury is directly connected to a carbon atom of an aromatic structure in which none of the carbon atoms has direct linkage with any element other than hydrogen, carbon and mercury.

2. The method of preparing aromatic mercury sulphonamides in which the aromatic mercury radical is linked to a sulphonamido group, which comprises reacting in solution a sulphonamide and an aromatic mercury hydroxide of the kind in which the mercury is directly connected to a carbon atom of an aromatic structure in which none of the carbon atoms has direct linkage with any element other than hydrogen, carbon and mercury.

3. The method of preparing aromatic mercury sulphonamides in which the aromatic mercury radical is linked to a sulphonamido group, which comprises reacting in solution an aromatic sulphonamide and an aromatic mercury hydroxide of the kind in which the mercury is directly connected to a carbon atom of an aromatic structure in which none of the carbon atoms has direct linkage with any element other than hydrogen, carbon and mercury.

4. The method of preparing aromatic mercury sulphonamides in which the aromatic mercury radical is linked to a sulphonamido group, which comprises reacting in solution a substituted aromatic sulphonamide and an aromatic mercury hydroxide of the kind in which the mercury is directly connected to a carbon atom of an aromatic structure in which none of the carbon atoms has direct linkage with any element other than hydrogen, carbon and mercury.

5. The method of preparing phenylmercury sulphonamides in which the phenylmercury radical is linked to a sulphonamido group, which comprises reacting in solution a sulphonamide and a phenylmercury compound.

6. The method of preparing phenylmercury sulphonamides in which the phenylmercury radical is linked to a sulphonamido group, which comprises reacting in solution a sulphonamide and phenylmercury hydroxide.

7. The method of preparing phenylmercury aromatic sulphonamides in which the phenylmercury radical is linked to a sulphonamido group, which comprises reacting in solution an aromatic sulphonamide and a phenylmercury compound.

8. The method of preparing phenylmercury aromatic sulphonamides in which the phenylmercury radical is linked to a sulphonamido group, which comprises reacting in solution a substituted aromatic sulphonamide and phenylmercury hydroxide.

9. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a radical containing a sulphonamido group that is linked to the RHg group through attachment to the nitrogen atom of the sulphonamido group; and in which $x$ represents the number of RHg groups in the compound and is an integer of at least one and not more than twice the number of sulphonamido groups in the radical $R_1$.

10. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents an aromatic radical containing a sulphonamido group that is linked to the RHg group through attachment to the nitrogen atom of the sulphonamido group; and in which $x$ represents the number of RHg groups in the compound and is an integer of at least one and not more than twice the number of sulphonamido groups in the radical $R_1$.

11. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents an aromatic radical containing a carboxylate radical and a sulphonamido group that in linked to the RHg group through attachment to the nitrogen atom of the sulphonamido group; and in which $x$ represents the number of RHg groups in the compound and is an integer of at least one and not more than twice the number of sulphonamido groups in the radical $R_1$.

12. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a substituted aromatic radical containing a sulphonamido group that is linked to the RHg group through attachment to the nitrogen atom of the sulphonamido group; and in which $x$ represents the number of RHg groups in the compound and is an integer of at least one and not more than twice the number of sulphonamido groups in the radical $R_1$.

13. A new phenylmercury compound of the general formula $(C_6H_5Hg)_x.R_1$, in which $R_1$ represents a radical containing a sulphonamido group that is linked to the $C_6H_5Hg$ group through attachment to the nitrogen atom of the sulphonamido group; and in which $x$ represents the number of $C_6H_5Hg$ groups in the compound and is an integer of at least one and not more than twice the number of sulphonamido groups in the radical $R_1$.

14. A new phenylmercury compound of the general formula $(C_6H_5Hg)_x.R_1$, in which $R_1$ represents an aromatic radical containing a sulphonamido group that is linked to the $C_6H_5Hg$ group through attachment to the nitrogen atom of the sulphonamido group; and in which $x$ represents the number of $C_6H_5Hg$ groups in the compound and is an integer of at least one and not more than twice the number of sulphonamido groups in the radical $R_1$.

15. A new phenylmercury compound of the general formula $(C_6H_5Hg)_x.R_1$, in which $R_1$ represents an aromatic radical containing a carboxylate radical and a sulphonamido group that is linked to the $C_6H_5Hg$ group through attachment to the nitrogen atom of the sulphonamido group; and in which $x$ represents the number of $C_6H_5Hg$ groups in the compound and is an integer of at least one and not more than twice the number of sulphonamido groups in the radical $R_1$.

16. A new phenylmercury compound of the general formula $(C_6H_5Hg)_x.R_1$, in which $R_1$ represents a substituted aromatic radical containing a sulphonamido group that is linked to the $C_6H_5Hg$ group through attachment to the nitrogen atom of the sulphonamido group; and in which $x$ represents the number of $C_6H_5Hg$ groups in the compound and is an integer of at least one and not more than twice the number of sulphonamido groups in the radical $R_1$.

17. Ortho N-phenylmercury sulphonamido sodium benzoate.

18. N-phenylmercury para-amino benzene sulphonamide.

19. N-phenylmercury saccharin.

CARL N. ANDERSEN.

CERTIFICATE OF CORRECTION.

Patent No. 2,135,553.  November 8, 1938.

CARL N. ANDERSEN.

It is hereby certified that error appears in the printed specification of the above numbered patent requiring correction as follows: Page 1, second column, line 3, for "-NR$_2$" read -NH$_2$; page 2, first column, line 8, for "n-amino" read m-amino; page 4, second column, line 22, in the table, for "alchol" read alcohol; and that the said Letters Patent should be read with this correction therein that the same may conform to the record of the case in the Patent Office.

Signed and sealed this 20th day of December, A. D. 1938.

Henry Van Arsdale (Seal)   Acting Commissioner of Patents.